Sept. 14, 1948.                J. H. PENNEY                 2,449,502
                             FAN-COOLED MOTOR
                            Filed June 8, 1946
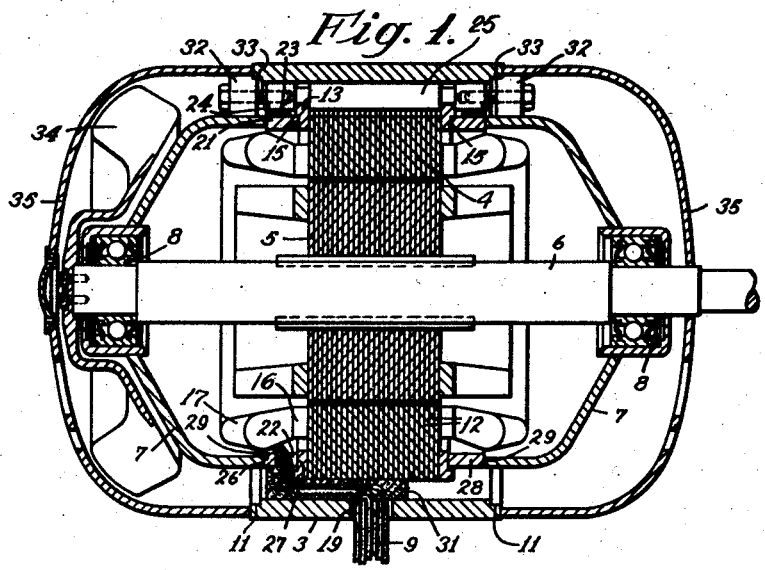
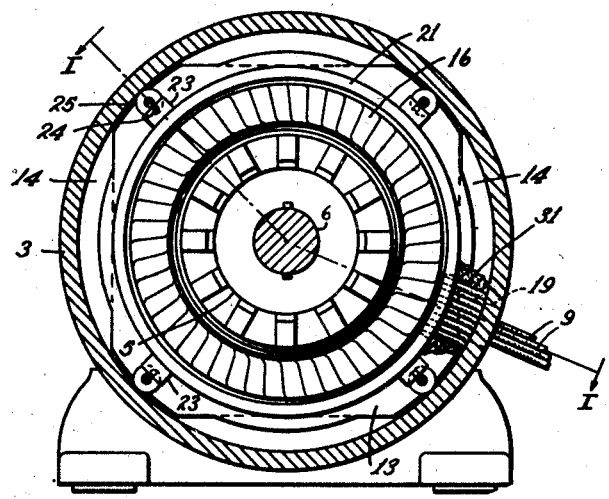
WITNESSES:                                          INVENTOR
Edward Michaels                                 James H. Penney.
                                              BY O. B. Buchanan
                                                   ATTORNEY Patented Sept. 14, 1948

2,449,502

UNITED STATES PATENT OFFICE 2,449,502

FAN-COOLED MOTOR

James H. Penney, Buffalo, N. Y., assignor to Westinghouse Electric Corporation, East Pittsburgh, Pa., a corporation of Pennsylvania Application June 8, 1946, Serial No. 675,475

6 Claims. (Cl. 171—252)

My invention relates to fan-cooled motors or generators, and it has particular relation to dynamo-electric machines having stator-members which are readily convertible and usable as the stator-members of protected or open machines, in a conversion-manner similar to that which is described and claimed in a copending application of Ludwig, Fockler, Formhals and Walton, Serial No. 690,628, filed August 15, 1946, and assigned to the Westinghouse Electric Corporation.

In order for a motor to be convertible from an open to an enclosed motor, or from a protected motor to a fan-cooled motor, it is highly desirable for the same stator member to be used for both types of machine, with as little conversion-trouble as possible. Since the stator member necessarily has leads, and since those leads must come out of the stator-frame whether the machine is open or closed, that is, whether it has open or closed end-brackets, it is necessary for the leads to come out of a hole or opening in the stator frame-ring, rather than through a hole in an end-bracket which would be a different end-bracket according as the machine was open or closed at its ends.

The principal object of my invention is to provide a dynamo-electric machine having a stator-construction which is basically utilizable as the stator of an open or protected dynamo-electric machine, and having a separate end-ring attachment which is secured to the end of the stator-core, so that it becomes essentially a part of the stator-member as distinguished from the end-brackets. This separate end-ring has a hole through which the stator-leads pass, on their way out to the hole in the stator frame-ring. When a closed or imperforate end-bracket is brought up tightly against the end-ring attachment, and when the hole through the end-ring is plugged by a suitable sealing-means, the machine becomes totally enclosed, ready to be fan-cooled by blowing air externally over the totally enclosed parts.

With the foregoing and other objects in view, my invention consists in the machines, apparatus, combinations, parts and methods hereinafter described and claimed, and illustrated in the accompanying drawing, wherein:

Figure 1 is a longitudinal sectional view of a fan-cooled squirrel-cage induction-motor embodying my invention, the section-plane being approximately indicated by the broken line I—I in Fig. 2, and Fig. 2 is a transverse sectional view of the same motor.

The drawing shows a totally enclosed dynamo-electric machine comprising a strong, rigid frame-ring 3, a stator-core member 4, a rotor-core member 5, a shaft 6, two imperforate end-brackets 7 having bearings 8 supporting the shaft, and stator-leads 9. The frame-ring 3 has an accurate radial-register surface 11 at each end thereof. The stator-core member 4 comprises a rigidly held stack of stator-laminations 12 with an end-plate 13 at each end. At a plurality of points around the periphery of the stator-core stack, the stator-laminations and end-plates fit within the inside of the frame-ring 3, and said stator-laminations and end-plates are spaced, at other peripheral points, from the inside of the frame-ring, thus providing axial ventilating spaces 14, running the length of the stator-core, between portions of the outer periphery of the stator-laminations and the inside of the frame-ring. The two end-plates 13 are secured within the frame ring 3 near the respective ends thereof. The end of each end-plate 13 has an accurate, continuous, axial-register surface 15.

The stator-core 4 carries a stator-winding 16, having end-turns 17 at each end. The stator-leads 9, which may be six or more in number, extend from the end-turns 17 at one end of the machine, and pass out of the machine through a hole 19 in the frame-ring 3.

In accordance with my invention, I provide a preferably detachable, or an easily applied, axially extending ring 21, which abuts against the axial-register surface 15 of the end-plate 13 at the end of the machine where the leads 9 leave the end-turns 17, and this ring is provided with a hole 22 through which the leads pass outwardly from the end-turns, and thence on out through the hole 19 in the frame-ring 3. This axially extending ring 21 is held in place, against the end-plate 13, by any suitable means, which may be more or less temporary, or more or less permanent, any suitable means being utilizable, such as a clip 23 which is secured, by a screw 24, to the end of a through-pin 25 which holds the stack of stator-core laminations together.

In the illustrated form of the invention, the hole 22 in the axially extending ring 21 is in the form of a notch cut in the inner end of the ring, where it abuts against the axial-register surface 15 of the end-plate 13 of the stator-core 4. Each end of this axially extending ring 21 has a continuous axial-register surface, 26 and 27, respectively, of a diameter corresponding to the axial-register surface 15 on the end-plate.

For the sake of symmetry, and to use duplicate parts as far as possible, a second axially extending ring 28 is preferably provided at the other end of the stator-core, this second ring-extension 28 being similar to the first ring-extension 21, except that it has no hole 22 through which leads must pass.

When two axially extending rings 21 and 28 are utilized, as shown, the two imperforate brackets 7 may be identical. Being imperforate, these brackets have no air-holes therein. They each have a peripheral portion having an accurate, continuous, axial-register surface 29 of a diameter corresponding to the axial-register surfaces 15, 26 and 27 of the end-plates 13 and their ring-extensions 21 and 28. The imperforate brackets 7 are pressed tightly (and hence substantially air-tightly) against the accurate axial-register surfaces 27 of the axially extending rings 21 and 28, which, in turn, constitute substantially air-tight extensions of the respective ends of the stator-core, and particularly, substantially air-tight extensions of the portion of the stator-core 4 immediately surrounding the stator end-turns 17 and concentrically spaced from the inside of the frame-ring 3.

The hole 22 in the ring 21, through which the leads 9 pass, when they first leave the end-turns 17, is plugged by a sealing-means 31.

The imperforate brackets 7 preferably have no radial register with their respective end-plates 13, or with their respective ring-extensions 21 or 28, but each imperforate bracket 7 is provided with a plurality of peripheral lugs 32 having radial-register surfaces 33 having an intermittent radial register with the radial-register surface 11 at that end of the frame-ring 3, thus accurately centering and aligning the bearings 8, while maintaining the axial ventilating-spaces 14 for external air-ventilation over the stator-laminations 12, over the axially extending rings 21 and 28, over the imperforate brackets 7, and over the bearings 8. This external air-ventilation may be maintained by means of a fan 34 surrounding one of the brackets 7, and two spaced end-hoods 35, one surrounding each bracket 7, in spaced relation thereto.

It will be apparent that my separate end-ring and lead-construction provides an attachment which is essentially a part of the stator-member of the machine, as distinguished from the removable end-brackets 7 and hoods 35; and that this end-ring construction makes it possible to seal the space where the leads come out through the hole 22, thus making an enclosed machine-construction out of a stator-member which, without the ring-extensions 21 and 28, is a stator-member suitable for an open machine-ventilation.

While I have described the end-plates 13 as being machined with accurate axial-register surfaces 15 before the ring-extensions 21 and 28 are added, with the ring-extensions similarly machined, at both ends, before being placed on the machine, it is obvious that the ring-extensions could be applied first to the respective ends of the stator-core, without any previous axial-register machining, and then the axial-register surfaces 27 could be machined, for cooperating with the respective end-brackets 7.

When I refer to an axial register as being continuous, I mean continuous in the sense of substantial air-tightness all the way around the machine, and I mean to include the illustrated construction in which a notch 22 is cut in the continuous axial-register surface 26, for receiving the stator-leads 9, this hole being subsequently plugged with a sealing-means 31, to restore the essential air-sealing continuity all the way around the periphery of the ring-extension 21.

In the foregoing and other respects, I desire that the appended claims shall be accorded the broadest construction reasonably consistent with their language.

I claim as my invention:

1. A totally enclosed dynamo-electric machine comprising a frame-ring, an end-plate secured within the inner periphery of the frame-ring near each end of the frame-ring, a stator-core member secured between the two end-plates, at least a portion of the outer periphery of the stator-core being radially spaced from the inner periphery of the frame-ring, the end-plates having air-vents therein, admitting of an axial air-flow over the stator-core from one end of the core to the other, a stator-winding carried by the stator-core, said stator-winding having end-turns, a plurality of leads extending from the end-turns at one end of the stator-winding, said frame-ring having a hole through which said leads pass, a shaft, a rotor-core member carried by the shaft, two imperforate brackets removably mounted on the machine, one at each end, each imperforate bracket having no air-hole therein, and having a bearing for supporting the shaft at that end of the machine, and further having a plurality of peripheral lugs having an intermittent radial register with that end of the frame-ring, the stator-core member further comprising at least one axially extending ring, secured to the end-plate at the end of the machine where the leads leave the end-turns, the stator-core member having a continuous axial register with each imperforate bracket, at least one of said axial registers being between said axially extending ring and the imperforate bracket at that end of the machine, said axially extending ring having a hole therein, through which said leads pass, and sealing-means for plugging the hole in said axially extending ring.

2. The invention as defined in claim 1, characterized by said axially extending ring being an attachment having a continuous axial register with the end of the end-plate at that end of the machine.

3. A totally enclosed dynamo-electric machine comprising a strong, rigid frame-ring having an accurate radial-register surface at each end thereof, a stator-core comprising a rigidly held stack of stator-laminations with an end-plate at each end, said stack, including end-plates and stator-laminations, fitting, at a plurality of spaced points about the outer periphery of the stator-core, within the inside of the frame-ring, the end plates and stator-laminations being spaced from the inside of the frame-ring at other peripheral points, the end of each end-plate having an accurate, continuous, axial-register surface, a stator-winding carried by the stator-laminations, said stator-winding having end-turns, a plurality of leads extending from the end-turns at one end of the stator-winding, said frame-ring having a hole through which said leads pass, two imperforate brackets removably mounted on the machine, one at each end, each imperforate bracket having no ventilating-hole therein and having no radial register with the end-plate at that end of the stator-core but having a plurality of peripheral lugs having radial-register surfaces having an intermittent radial register with the radial-register surface at that end of the frame-ring, bearings carried by said imperforate brackets, a rotor-member having a shaft which is supported by said bearings, the enclosure of said machine being completed by a continuous axial register with the imperforate bracket at each end of the stator-core, each imperforate bracket having a peripheral portion having a continuous axial-register surface of a diameter corresponding to the axial-register surface on the end-plate, an axially extending ring interposed between the imperforate bracket and the end-plate at at least the end of the machine where the leads leave the end-turns, means for holding said axially extending ring on the stator-core, each end of said axially extending ring having a continuous axial-register surface of a diameter corresponding to the axial-register surface on the end-plate, said axially extending ring having a hole therein, through which said leads pass, and sealing-means for plugging the hole in said axially extending ring.

4. A dynamo-electric machine comprising a frame-ring, an end-plate secured within the inner periphery of the frame-ring near each end of the frame-ring, a stator-core member secured between the two end-plates, at least a portion of the outer periphery of the stator-core being radially spaced from the inner periphery of the frame-ring, the end-plates having air-vents therein, admitting of an axial air-flow over the stator-core from one end of the core to the other, a stator-winding carried by the stator-core, said stator-winding having end-turns, a plurality of leads extending from the end-turns at one end of the stator-winding, said frame-ring having a hole through which said leads pass, and a rotor-core member rotatable within the stator-core member, the stator-core member further comprising at least one axially extending ring, secured to the end-plate at the end of the machine where the leads leave the end-turns, said axially extending ring having a hole therein, through which said leads pass.

5. The invention as defined in claim 4, characterized by said axially extending ring being an attachment having a continuous axial register with the end of the end-plate at that end of the machine.

6. A dynamo-electric machine, characterized by having a strong, rigid frame-ring, a stator-core comprising a rigidly held stack of stator-laminations with an end-plate at each end, said stack, including end-plates and stator-laminations, fitting, at a plurality of spaced points about the outer periphery of the stator-core, within the inside of the frame-ring, the end-plates and the stator-laminations being spaced from the inside of the frame-ring at other peripheral points, the end of each end-plate having an accurate, axial-register surface, a stator-winding carried by the stator-laminations said stator-winding having end-turns, a plurality of leads extending from the end-turns at one end of the stator-winding, said frame-ring having a hole through which said leads pass, two end-brackets removably mounted on the machine, each end-bracket having a peripheral portion having an accurate axial-register surface of a diameter corresponding to the axial-register surface on the end-plate, an axially extending ring interposed between the end-bracket and the end-plate at at least the end of the machine where the leads leave the end-turns, and means for holding said axially extending ring on the stator-core, each end of said axially extending ring having an axial-register surface of a diameter corresponding to the axial-register surface on the end-plate, said axially extending ring having a hole therein, through which said leads pass.

JAMES H. PENNEY.

REFERENCES CITED

The following references are of record in the file of this patent:

UNITED STATES PATENTS

| Number | Name | Date |
| --- | --- | --- |
| 1,086,818 | Gray | Feb. 10, 1914 |
| 1,858,261 | Barnholt | May 17, 1932 |
| 2,295,262 | Lamb | Sept. 8, 1942 |

FOREIGN PATENTS

| Number | Country | Date |
| --- | --- | --- |
| 709,373 | France | May 18, 1931 |